(12) United States Patent
Block et al.

(10) Patent No.: US 10,281,274 B2
(45) Date of Patent: May 7, 2019

(54) LEVEL AND LEVEL-STRAIGHTEDGE SYSTEM

(71) Applicant: Milwaukee Electric Tool Corporation, Brookfield, WI (US)

(72) Inventors: Daniel L. Block, West Allis, WI (US); John R. Christianson, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 141 days.

(21) Appl. No.: 15/620,640

(22) Filed: Jun. 12, 2017

(65) Prior Publication Data

US 2017/0370718 A1  Dec. 28, 2017

Related U.S. Application Data

(60) Provisional application No. 62/355,097, filed on Jun. 27, 2016.

(51) Int. Cl.
*G01C 9/34* (2006.01)
*B43L 7/00* (2006.01)
*G01C 9/28* (2006.01)

(52) U.S. Cl.
CPC .............. *G01C 9/34* (2013.01); *B43L 7/00* (2013.01); *G01C 9/28* (2013.01)

(58) Field of Classification Search
CPC ....................................................... G01C 9/34
USPC ................................................... 33/354, 381
See application file for complete search history.

(56) References Cited

U.S. PATENT DOCUMENTS

| | | | |
|---|---|---|---|
| 1,010,678 A | 12/1911 | Oehrle | |
| 2,551,524 A | 5/1951 | Bullivant | |
| 2,633,640 A | 4/1953 | Bucsko | |
| 3,311,988 A | 4/1967 | Manville | |
| 3,832,782 A | 9/1974 | Johnson et al. | |
| 4,693,011 A * | 9/1987 | Strayham | G01B 3/566 33/382 |
| 4,733,475 A | 3/1988 | Youmans | |
| 5,103,573 A * | 4/1992 | Ehling | G01C 9/34 33/379 |
| 5,279,041 A * | 1/1994 | Wright | G01C 9/28 33/379 |
| 5,339,530 A * | 8/1994 | Wright | G01B 3/566 33/379 |
| 5,729,041 A | 3/1998 | Yoo et al. | |
| 6,568,095 B2 | 5/2003 | Snyder | |
| 6,732,441 B2 | 5/2004 | Charay et al. | |
| 7,117,606 B2 | 10/2006 | Brown | |
| 7,975,395 B2 | 7/2011 | Keller et al. | |
| 8,011,108 B2 | 9/2011 | Upthegrove | |

(Continued)

*Primary Examiner* — George B Bennett
(74) *Attorney, Agent, or Firm* — Reinhart Boerner Van Deuren s.c.

(57) ABSTRACT

A level and level-straightedge system is provided. The level may include one or more slip-resistant structure. The slip-resistant structure may be a collar formed from a high friction polymer material that at least partially surrounds a level vial. The collar may be co-molded with the material of the vial surround. The level may be a relatively small level having a length less than 14 inches and may include a groove for receiving a straightedge. The groove design alone or in combination with the collar may allow for a relatively short level to support a relatively long straightedge.

20 Claims, 8 Drawing Sheets

(56) References Cited

U.S. PATENT DOCUMENTS

| | | | |
|---|---|---|---|
| 8,046,929 B2 | 11/2011 | Yowonske | |
| 8,443,524 B2* | 5/2013 | Kildevaeld | G01C 9/32 33/348.2 |
| 8,640,351 B2 | 2/2014 | Chang | |
| 2007/0028472 A1 | 2/2007 | Brown | |
| 2008/0250662 A1* | 10/2008 | Allemand | G01C 9/32 33/379 |
| 2011/0119941 A1* | 5/2011 | Steele | G01C 9/28 33/379 |
| 2013/0091717 A1* | 4/2013 | Steele | G01C 9/18 33/382 |
| 2013/0269196 A1* | 10/2013 | Steele | H02G 1/00 33/379 |
| 2015/0096182 A1 | 4/2015 | Silberberg | |
| 2015/0204666 A1 | 7/2015 | Hill | |
| 2016/0025490 A1* | 1/2016 | Hoppe | G01C 9/26 33/381 |
| 2016/0138917 A1 | 5/2016 | Schwoegler et al. | |

\* cited by examiner

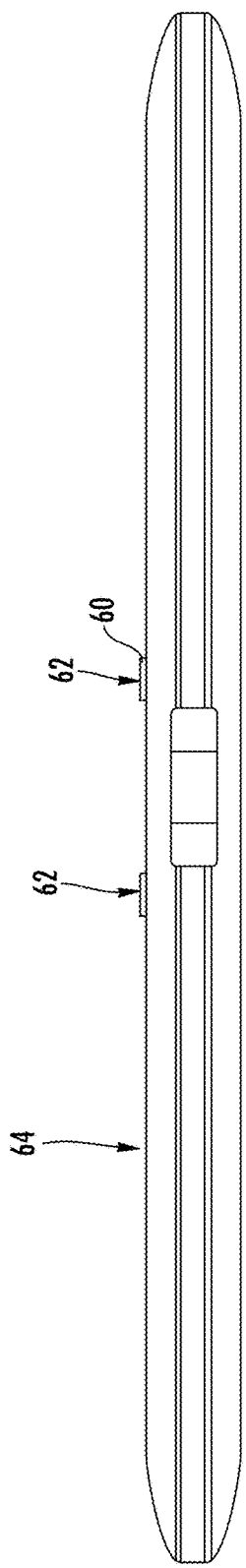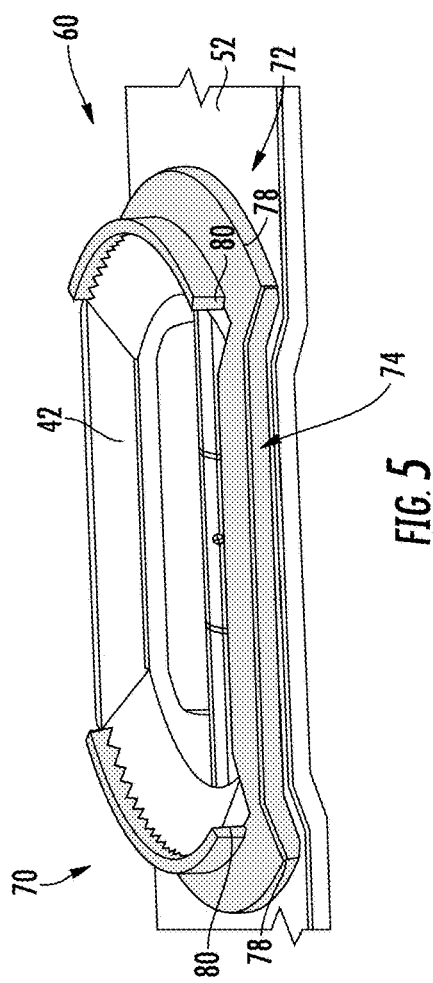

LEVEL AND LEVEL-STRAIGHTEDGE SYSTEM

CROSS-REFERENCE TO RELATED PATENT APPLICATION

The present application claims the benefit of and priority to U.S. Provisional Application No. 62/355,097, filed on Jun. 27, 2016, which is incorporated herein by reference in its entirety.

BACKGROUND OF THE INVENTION

The present invention relates generally to the field of tools. The present invention relates specifically to a tool, such as a level, a spirit level, a torpedo level, a billet torpedo type level, a block torpedo type level, etc., with an anti-slip or gripping material molded (e.g., via co-molding) to a vial surround of the level. Levels, such as spirit levels, are used to determine the levelness of a structure, surface or workpiece. In use, the level is placed on or in contact with a surface to be measured, and the user views the location of a bubble within a vial relative to markings that indicate the levelness of the structure, surface or workpiece.

SUMMARY OF THE INVENTION

In various embodiments, the level includes a level body having a vial surround surrounding an opening, and the vial surround is formed from a first material, such as a first polymer material or a metal material. The level includes a level vial located within the opening. The level includes a collar formed from a second polymer material. The collar at least partially surrounds the vial surround opening and has an inner surface bonded to an outer surface of the vial surround. The collar defines a maximum width of the level such that the outmost surface of the collar is positioned to contact a workpiece surface first, before other surfaces of the level adjacent the collar contact the workpiece surface.

In various embodiments, the collar is formed from a high friction material having a coefficient of sliding friction greater than that of the first material. In various embodiments, the collar is formed from at least one of a thermoplastic material, a thermoplastic elastomer material, a thermoplastic rubber material, a thermoplastic vulcanite material, a thermoplastic urethane material and a silicone material. In various embodiments, the collar partially surrounds the opening such that the collar includes a gap of at least 45 degrees between opposing end surfaces of the collar. In various embodiments, the level is a small level having a length in the longitudinal direction less than 14 inches, specifically less than 12 inches and more specifically less than 10 inches.

In various embodiments, a process for forming a level having an anti-slip collar is provided. The process includes co-molding a vial surround and a collar coupled to the vial surround. The vial surround is molded from a first polymer material, and the collar is molded from a second polymer material, different from the first material. The second polymer material is compatible with the first polymer material such that a bond is formed between the first and second polymer materials. In various embodiments, the collar directly contacts the material of the vial surround, and in some such embodiments, no adhesive material is located between the vial surround and the collar.

Another embodiment relates to a level and straightedge system comprising a level and a straightedge. The straightedge comprises an upper wall defining a planar upper surface and a lower wall defining a planar base surface parallel to the upper surface. The level comprises a vertical wall coupling the upper wall to the lower wall. The level comprises a vial opening defined at least in part within the vertical wall and a level vial supported within the vial opening. The level comprises a maximum length extending between opposing ends of the level and a channel formed in the upper wall that extends the entire length of the upper wall. A vertical plane bisecting the vertical wall intersects the channel. The system includes a straightedge having a lower end positioned within the channel such that the straightedge is supported by the level. The straightedge is positioned within the channel at an angle relative to the vertical plane. A maximum length of the straightedge is at least twice the maximum length of the level.

Another embodiment relates to a level including a level frame formed from a metal material. The level frame includes an upper wall defining a planar upper surface and a lower wall defining a planar base surface parallel to the upper surface. The level includes a vertical wall coupling the upper wall to the lower wall, and the vertical wall defines a vertical plane that bisects the vertical wall. The level frame includes a vial opening defined at least in part within the vertical wall. The upper wall and lower wall are horizontal walls and the vertical wall is perpendicular to the upper and lower wall, and the vertical wall is positioned such that a vertical plane bisecting the vertical wall also bisects the upper wall and the lower wall. The level includes a level vial supported by the level frame within the vial opening. The level includes a body plate coupled to the vertical wall formed from a first plastic material. The level includes a gripping collar formed from a second plastic material coupled to the first plastic material of the body plate, the gripping collar at least partially surrounding the vial opening and extending horizontally outward away from the vertical central wall such that the gripping collar defines a maximum width of the level.

Another embodiment relates to a level including a level frame formed from a metal material. The level frame includes an upper wall defining a planar upper surface and a lower wall defining a planar base surface parallel to the upper surface. The level frame includes a vertical wall coupling the upper wall to the lower wall and a vial opening defined at least in part within the vertical wall. The level frame includes a channel formed in the upper wall that extends the entire length of the upper wall, and a vertical plane that bisects the vertical wall also intersects the channel. The level includes a level vial supported by the level frame within the vial opening. The level includes a body plate coupled to the vertical wall formed from a first plastic material. The level includes a gripping collar formed from a second plastic material bonded via co-molding to the first plastic material of the body plate. The gripping collar at least partially surrounds the vial opening and extends horizontally outward away from the vertical central wall such that the gripping collar defines a maximum width of the level. A maximum length extending between opposing ends of the level frame is 14 inches or less.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIG. 4 is a top view of the level of FIG. 1, according to an exemplary embodiment.

FIG. 5 is a detailed perspective view from below of a vial surround including an anti-slip collar, according to an exemplary embodiment.

DETAILED DESCRIPTION

Figure 1:
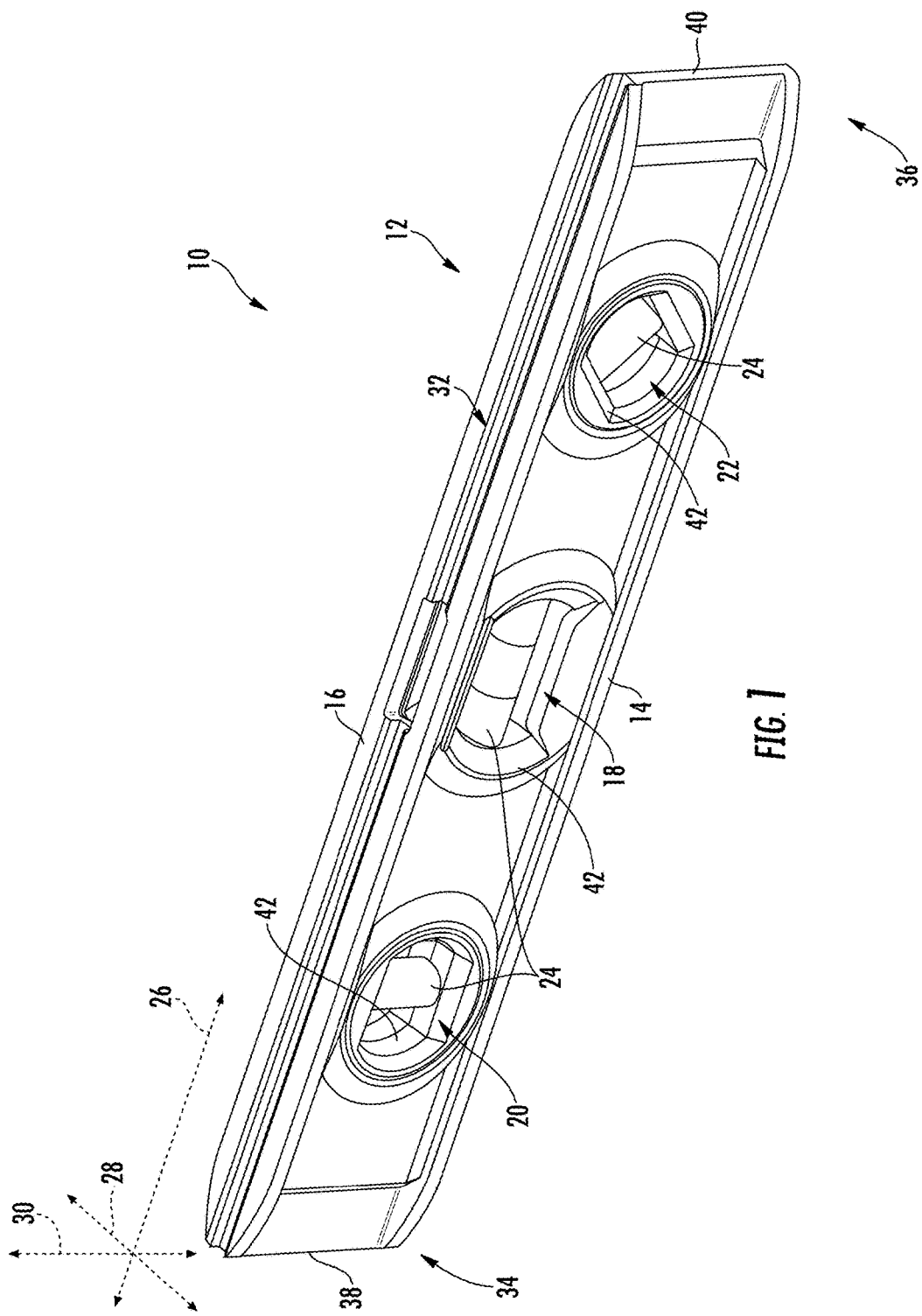
FIG. 1 is a perspective view of a level, according to an exemplary embodiment.

Referring generally to the figures, various embodiments of a level are shown. In general, the levels discussed herein include one or more level vials each supported within a vial surround which are in turn supported within a level body. The level body includes a generally planar base surface and an opposing upper surface that is generally parallel to the planar base surface. As will be generally understood, the base of the level is placed on a workpiece (e.g., a structure, surface, etc.) in order for the user of the level to measure the degree of level or plumb of a surface by observing the position of a bubble within each level vial.

In various embodiments, the level discussed herein includes one or more features that facilitate use, handling, and measuring utilizing the level. In specific embodiments, at least one of the vial surrounds, and specifically the central vial surround, include a collar formed from an anti-slip or gripping (e.g., a high friction) material that protrudes slightly beyond the face of the level. The gripping material may generally be a relatively soft material (e.g., soft-touch material, a thermoplastic material, a thermoplastic elastomer material (TPE), a thermoplastic urethane material (TPU), a thermoplastic rubber material (TPR), a thermoplastic vulcanite material (TPV), a silicone, etc.) that helps hold the level in place relative to a work surface via friction, and in specific embodiments, the material of the gripping collar is also a non-marring material such that the material does not mark a work surface when in contact with the workpiece.

In various embodiments, the gripping collar is structured and manufactured in a manner that Applicant believes improves function and manufacturability relative to at least some other level designs. For example, in some embodiments, the gripping collar may be co-molded with the vial surround. Co-molding increases manufacturing efficiency by eliminating at least one assembly step that may otherwise be needed to assemble a separately molded gripping collar to a vial surround. Further, in at least some embodiments, Applicant believes that co-molding utilizing bond-compatible materials for both the vial surround and the gripping collar achieves a high level of bonding between the vial surround and gripping collar without the need for a separate layer of adhesive to bond the gripping collar to the vial surround. Further, by co-molding the gripping collar with the vial surround, a mating geometry between the contact surfaces of the vial surround and the collar may be selected to further facilitate coupling between the vial surround and the gripping collar.

In specific embodiments, the level is a relatively small level (e.g., longitudinal length less than 14 inches, less than 12 inches, less than 10 inches, etc.), and specifically may be a torpedo level including ends that taper toward the longitudinal axis forming narrow opposing end surfaces. In specific embodiments, level embodiments discussed herein include a groove or channel along the entire longitudinal length of the upper surface, and in use, the groove supports a large straightedge for marking lines having a length greater than the length of the level. Thus, in such embodiments, Applicant believes that the gripping collar discussed herein is advantageous, despite the relatively small length of the level itself, because the gripping collar facilitates stability during straightedge marking and measuring across large straightedge lengths. Accordingly, in such embodiments, Applicant has identified the need for a gripping structure to maintain stability even in a relatively small level.

Referring to FIG. 1, a leveling device, such as level 10, is shown according to an exemplary embodiment. In general, level 10 includes a body 12 that includes a base surface 14 and an opposing top surface 16. Base surface 14 is a flat, planar surface that engages a surface of a workpiece to be measured using level 10. In some specific embodiments, base surface 14 is machined to have a flat, flush or planar surface following extrusion, and in some embodiments, this machined surface may be anodized.

Level 10 includes a plurality of through bores formed through body 12. As shown in FIG. 1, level 10 includes a central opening 18, a first end opening 20 and a second end opening 22. As will be understood, openings 18, 20 and 22 receive three level vials 24 (e.g., bubble vials) which are held in the appropriate orientation relative to base surface 14 in order for the vials to indicate the angle, levelness, plumb, etc. of the corresponding surface of a workpiece.

As shown in FIG. 1, body 12 of level 10 generally defines a longitudinal axis 26, a width axis 28 and a height axis 30. Surfaces 14 and 16 have a length extending generally in the direction of longitudinal axis 26 and reside planes defined by axes 26 and 28. Openings 18, 20 and 22 each define an axis extending between the left and right sides of level 10 in the direction of width axis 28 such that openings 18, 20 and 22 are substantially perpendicular to longitudinal axis 26.

Level 10 includes a channel or groove 32 formed along upper surface 16 that extends the length of level body 12 in the direction of longitudinal axis 26. Groove 32 is a recessed channel set below (e.g., recessed in the direction of height axis 30) upper surface 16. In some embodiments, groove 32 is sized to receive a straightedge that is longer than level 10 for the marking or lines on a workpiece. As explained below, among other functions, the gripping structure of level 10 limits or prevents movement of level 10 relative to the workpiece during marking, which in turn facilitates the marking of straight lines, even when using a straightedge having a length several times longer than the length of level 10.

In at least some embodiments, level 10 is a relatively small level having a length in the direction of longitudinal axis 26 less than or equal to 14 inches, specifically less than or equal to 12 inches and more specifically less than or equal to 10 inches. In various embodiments, level 10 has tapered end sections 34 and 36 that taper inwardly toward longitudinal axis 26 such that the end sections 34 and 36 transition to narrow, vertical end surfaces 38 and 40. Specifically the upper and lower walls (e.g., see walls 110 and 114 in FIG. 9) that form base surface 14 and upper surface 16 have decreasing widths at end sections 34 and 36 such that the width of surfaces 14 and 16 decrease in the width direction to join the narrower width of end surfaces 38 and 40. In the specific embodiment shown, level 10 is a torpedo level. In other embodiments, the level designs and components discussed herein may be utilized in any other style of level, such as box levels, billet levels, I-beam levels, etc.

Referring to FIG. 1, each of the level vials 24 is supported within body 12 by a vial surround 42. In general, vial surround 42 is a generally annular or elongate shaped piece of level body 12 and supports one of the level vials 24. In various embodiments, vial surrounds 42 are one or more molded polymer pieces that is mounted (e.g., via adhesive, press-fit, interference fit, etc.) to the other portions forming level body 12.

Figure 2:
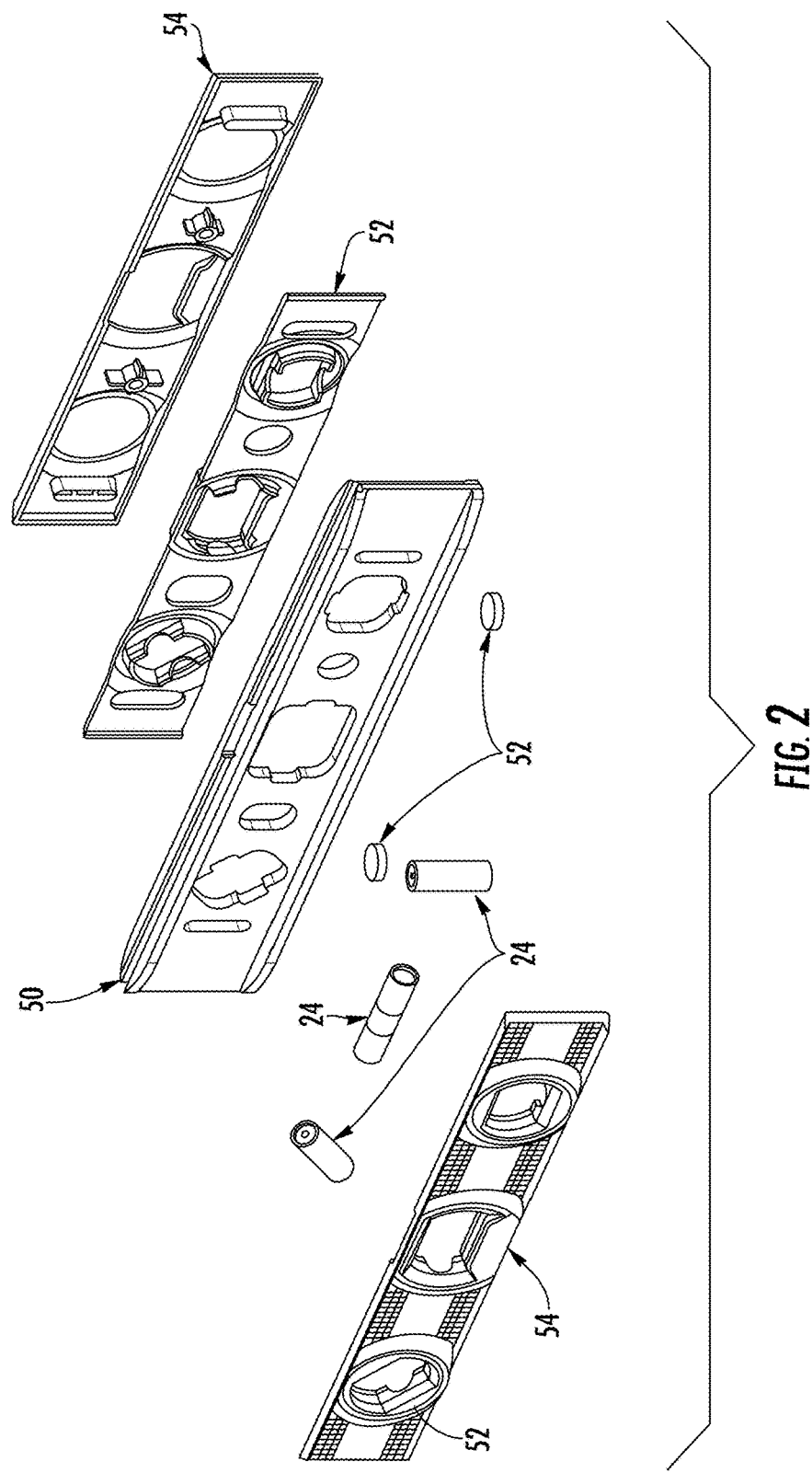
FIG. 2 is an exploded view of the level of FIG. 1, according to an exemplary embodiment.

Referring to FIG. 2, an exploded view of level 10 is shown according to an exemplary embodiment. As shown, level 10 includes a central body member 50, and in specific embodiments, central body member 50 is a metal structure that includes both base surface 14 and upper surface 16. In various embodiments, central body member 50 is formed from a metal material, such as an extruded metal material (e.g., extruded aluminum), a die-cast metal, molded metal, etc. Level 10 includes a pair of opposing body plates, shown as mounting plates 52, and a pair of face plates 54, and in FIG. 2, the left mounting plate 52 is shown mounted to the left face plate 54. In general, mounting plates 52 each define a portion of each of the vial surrounds 42. In this arrangement, when assembled, a portion of each vial surround 42 is contributed by each of the mounting plates 52, and each level vial 24 is rigidly mounted between opposing portions of the left and right mounting plates 52 within each vial surround 42.

As shown in FIG. 2, mounting plates 52 are mounted to the left side and right side of central body member 50, respectively and one of the face plates 54 is mounted to the outside of each of the mounting plates 52. In this arrangement, level vials 24 are supported within level body 12, and the central body member 50, mounting plates 52 and face plates 54 are coupled together forming level 10. In specific embodiments, as shown in FIG. 2, level 10 includes one or more magnetic coupling element, shown as magnets or magnetic circuits 56, that are mounted within central body member 50, below base surface 14 such that the magnets facilitate holding of level 10 to a magnetic workpiece.

Figure 3:
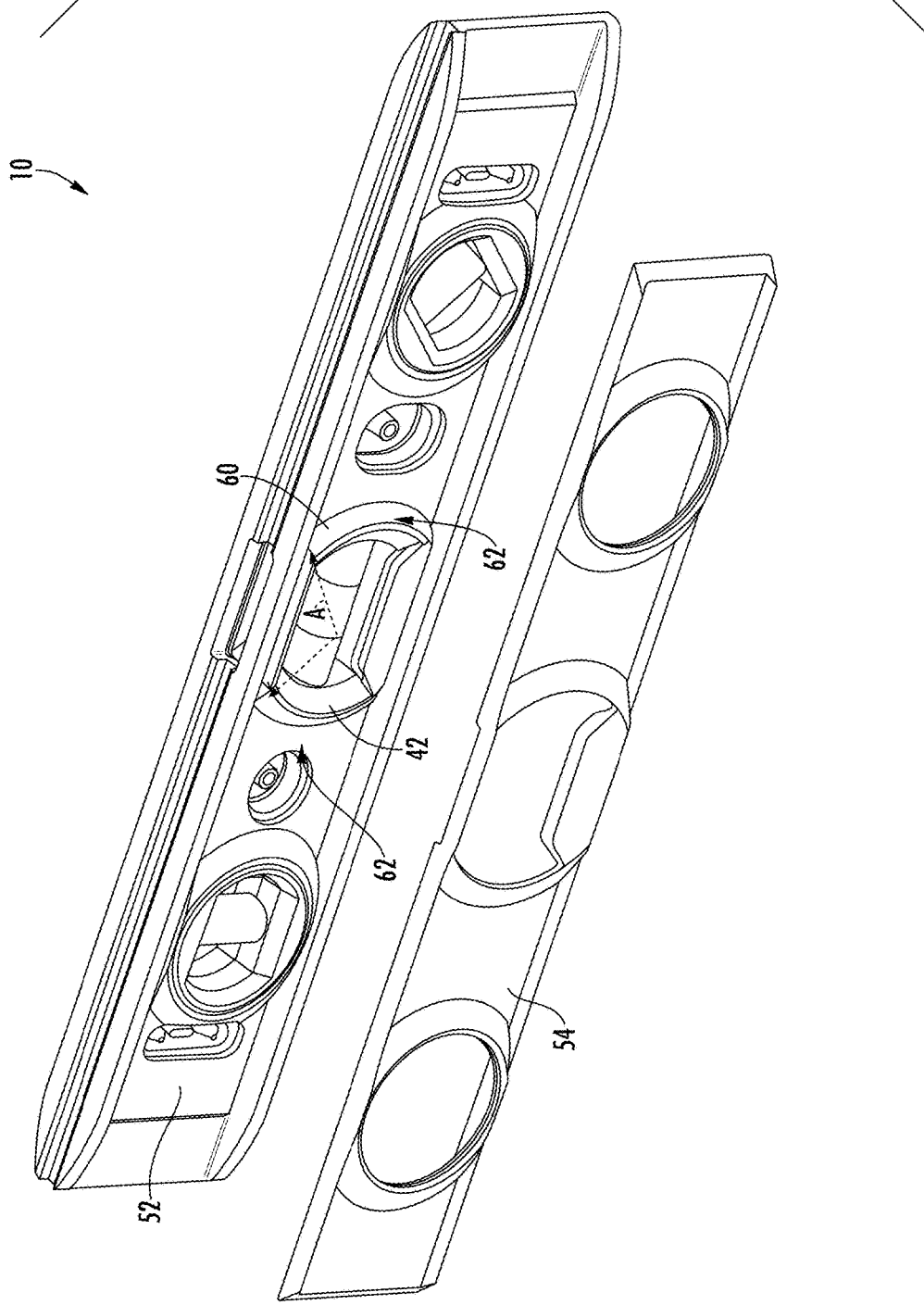
FIG. 3 is a partial exploded view of the level of FIG. 1 showing a face plate spaced from the level body and vial surround, according to an exemplary embodiment.

Referring to FIG. 3, level 10 is shown with the left face plate 54 removed from the left mounting plate 52. In various embodiments, level 10 includes an anti-slip or gripping collar, shown as collar 60. Gripping collar 60 is formed from a high friction, anti-slip or gripping material that increases friction against a workpiece surface which limits or prevents slippage of level 10 relative to the workpiece during use.

In various embodiments, gripping collar 60 is formed from a polymer material such as a TPE, TPU or silicone material. In general, gripping collar 60 is formed from a polymer material that is different from the polymer material that forms mounting plate 52. For example, in various embodiments, gripping collar 60 is a different polymer type than mounting plate 52, and in other embodiments, gripping collar 60 is formed from the same polymer type (e.g., both are polyethylene polymers) but that have different physical characteristics, different additives, etc. In various embodiments, gripping collar 60 is formed from a high friction polymer material having a coefficient of sliding friction greater than the coefficient of sliding friction of the material forming mounting plate 52 and vial surround 42. In specific embodiments, gripping collar 60 has a coefficient of sliding friction that is at least 10% greater, specifically at least 50% greater and more specifically at least double the coefficient of sliding friction of the material forming mounting plate 52 and vial surround 42. In various embodiments, gripping collar 60 is formed from a compressible polymer material having a durometer less than the durometer of the material forming mounting plate 52 and vial surround 42. In a specific embodiment, gripping collar 60 is formed from a Shore A material and mounting plate 52 and/or vial surround 42 is formed from a Shore D material. In various embodiments, gripping collar 60 is formed from an elastic polymer material having a Young's modulus of elasticity less than the Young's modulus of elasticity of the material forming mounting plate 52 and vial surround 42.

Further, gripping collar 60 is sized relative to level body 12 to facilitate engagement with an adjacent workpiece surface. Referring to FIG. 4, gripping collar 60 has outer surface 62. In various embodiments, at least a portion of outer surface 62 resides in a generally vertical plane such that at least a portion of outer surface 62 is parallel to height axis 30. Gripping collar 60 has a width in the direction of width axis 28 such that outer surface 62 is the outermost surface of level 10 in the width direction on at least one side of level 10 (i.e., the left side in the orientation of FIG. 3. In this arrangement, outer surface 62 of gripping collar 60 is able to engage the surface of the work piece to provide the anti-slip function discussed herein. In various embodiments, outer surface 62 of gripping collar 60 is spaced between 0.1 inches and 0.01 inches from the adjacent lateral surface 64 of level body 12, specifically between 0.03 inches and 0.05 inches, and more specifically about 0.037 inches (e.g., 0.037 inches plus or minus 10%).

Figure 6:
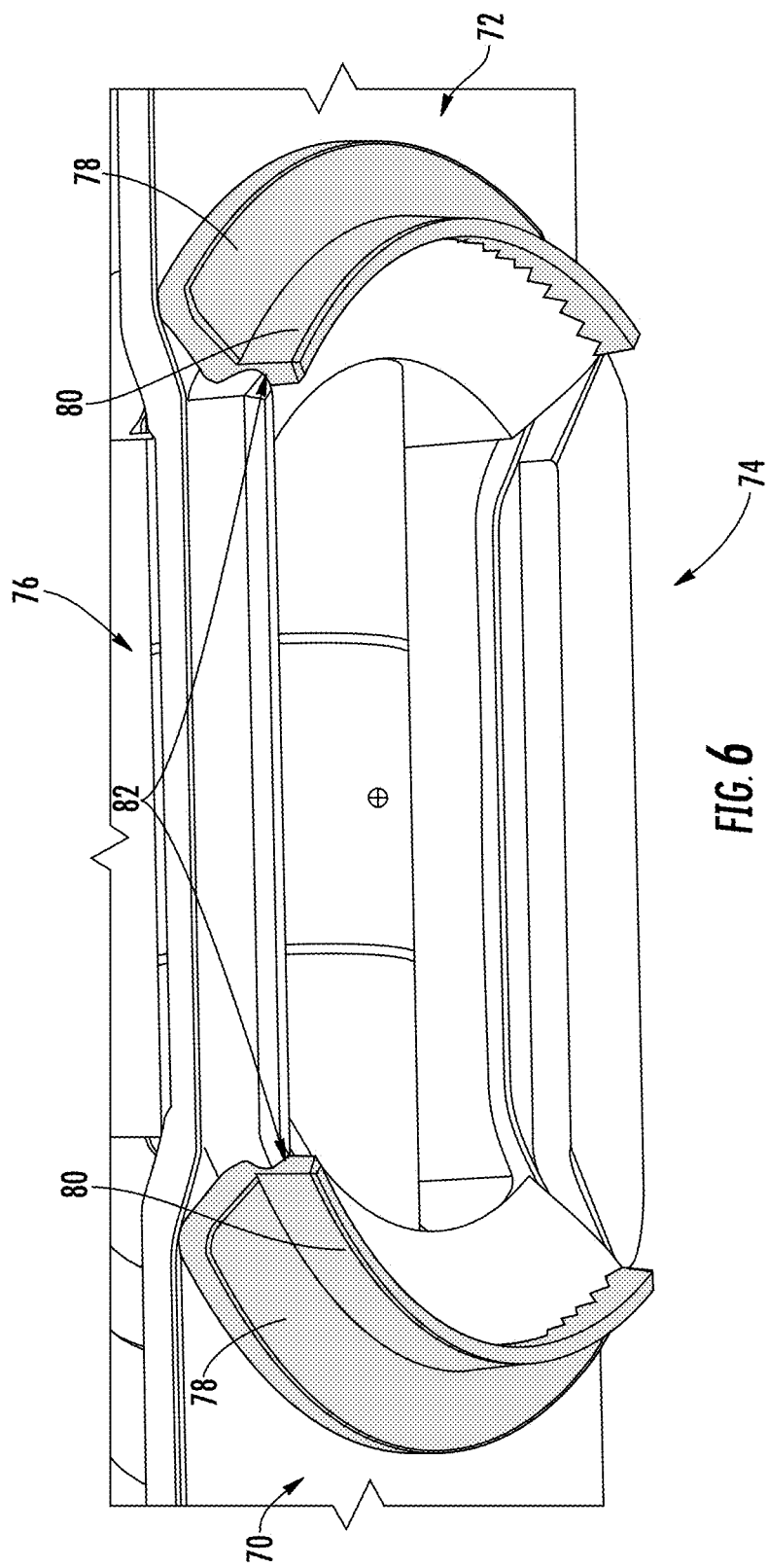
FIG. 6 is a detailed perspective view from above of a vial surround including an anti-slip collar, according to an exemplary embodiment.

In various embodiments, gripping collar 60 is sized and shaped relative to mounting plate 52 and vial surround 42 to facilitate coupling of gripping collar 60 to mounting plate 52 and/or to facilitate molding of gripping collar 60 to mounting plate 52. As shown in FIG. 5 and FIG. 6, gripping collar 60 includes a left section 70, a right section 72 and a lower section 74 that together surround and contact vial surround 42.

In the embodiment shown, gripping collar 60 includes a gap 76 between the opposing upper ends of left section 70 and right section 72 such that an upper portion of vial surround 42 is not surrounded/contacted by gripping collar 60. In this arrangement, gripping collar 60 surrounds less than all of vial surround 42. In specific embodiments, gripping collar 60 is sized such that an angle A is measured from the center point of the vial opening between the opposing upper ends of left section 70 and right section 72. In various embodiments, angle A is at least 30 degrees, and more specifically at least 45 degrees such that at least a 45 degree portion of vial surround 42 is not surrounded by gripping collar 60.

Left section 70 and right section 72 each include a flange section 78 and wall section 80. In general, flange section 78 extends away from vial surround 42 along the outer surface of mounting plate 52, and wall sections 80 extend outward, in the direction of width axis 28, away from flange section 78 and mounting plate 52. As shown in FIG. 6, the lower or inner surfaces 82 of wall sections 80 follow the contours of the outer surface of vial surround 42 such that inner surfaces 82 partially surround the outer surfaces of vial surround 42. This surrounding engagement between inner surface 82 and the outer surface of vial surround 42 acts to couple gripping collar 60 to vial surround 42 through bonding and/or friction fit. In addition, lower section 74 surrounds a lower portion of vial surround 42 and further facilitates coupling of gripping collar 60 to vial surround 42.

In various embodiments, level 10 is formed utilizing a co-molding process (e.g., a co-injection molding process) to co-mold different layers or types of materials together using a single step molding process. In the particular, gripping collar 60 may be co-molded with mounting plate 52. In such embodiments, a mold such as a co-injection mold delivers a first material (e.g., a first polymer material) into a portion of the mold shaped to form mounting plate 52 and also delivers a second material (e.g., a second polymer material, a soft-touch material, a TPE, a TPU, etc.) to a portion of the mold shaped to form gripping collar 60 in the position and engaging vial surround 42 as discussed herein. Thus, in such embodiments, gripping collar 60 is molded in place around vial surround 42 such that a subsequent assembly step is not needed to position gripping collar 60 around vial surround 42.

In various embodiments, the material of gripping collar 60 is compatible with the material of mounting plate 52 such that a bond is formed between the polymer material of gripping collar 60 and the polymer material of mounting plate 52. In some embodiments, the bond is sufficient to hold gripping collar 60 to mounting plate 52 without the need for an adhesive between gripping collar 60 and mounting plate 52, and in such embodiments, the inner surface of gripping collar 60 directly contacts the outer surface of mounting plate 52 at vial surround 42. In various embodiments, the bond between gripping collar 60 and mounting plate 52 is relatively weak such that gripping collar 60 may be peeled from mounting plate 52 with a relatively low amount of force (e.g., peelable by hand). In such embodiments, a bond of adhesion is formed by direct contact between the polymer material of gripping collar 60 and the polymer material of mounting plate 52 at an interface between the two materials. The adhesion bond between the polymer material of gripping collar 60 and the polymer material of mounting plate 52 is formed without use of an additional adhesive material, and in specific embodiments, the adhesion bond holds gripping collar 60 to mounting plate 52 without use of friction fit structures (e.g., press-fit structures).

Figure 7:
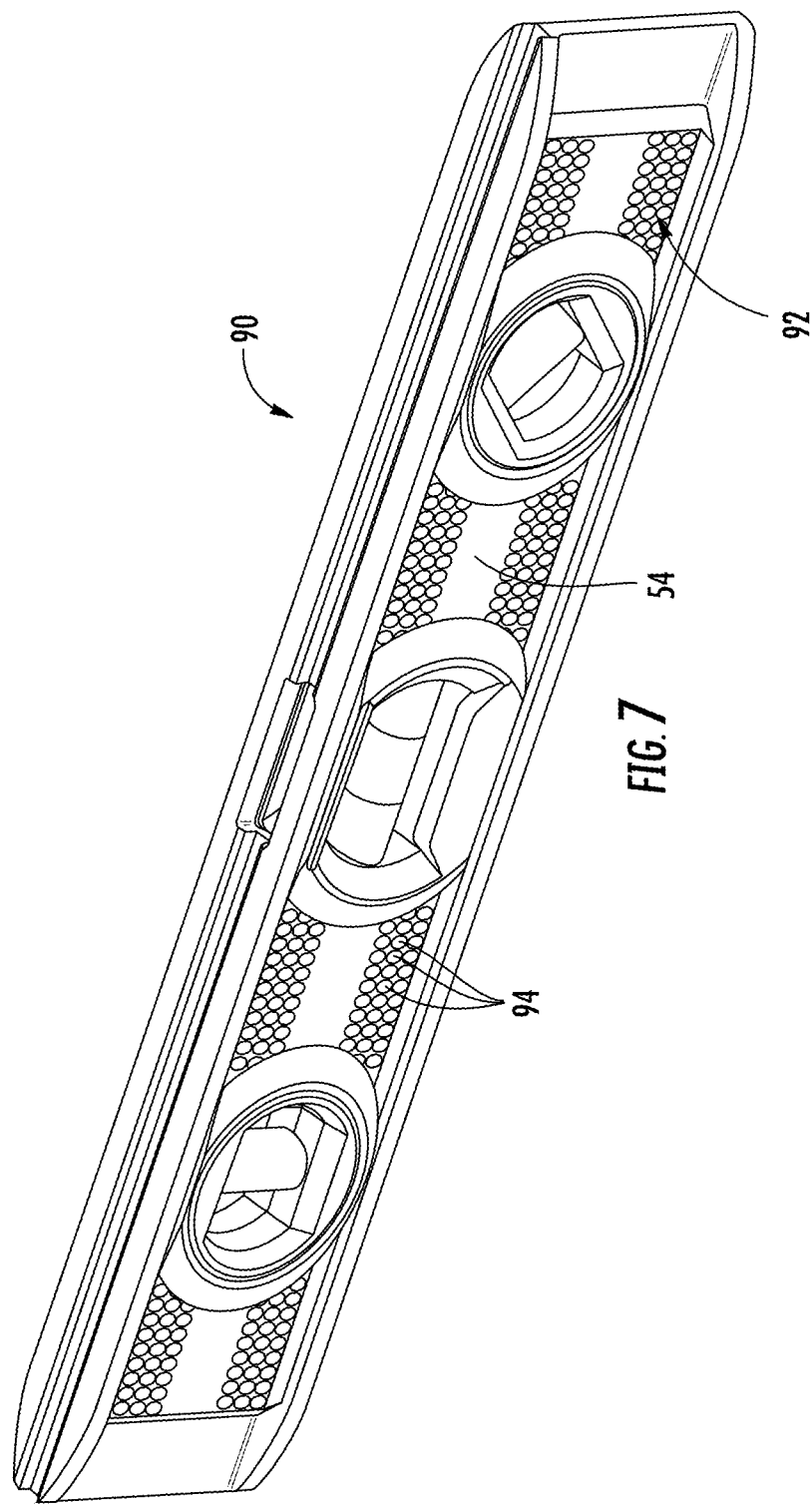
FIG. 7 is a perspective view of a level, according to another exemplary embodiment.

Referring to FIG. 7, a level, such as level 90, is shown according to an exemplary embodiment. Level 90 is substantially the same as level 10 discussed above. However, as shown in FIG. 7, face plate 54 of level 90 includes a textured outer surface 92. Textured outer surface 92 includes a plurality of raised bumps 94 that may provide increase texture allowing level 90 to held/gripped by a user more easily, and in specific embodiments, textured outer surface 92 may form an aesthetic design or pattern.

Figure 8:
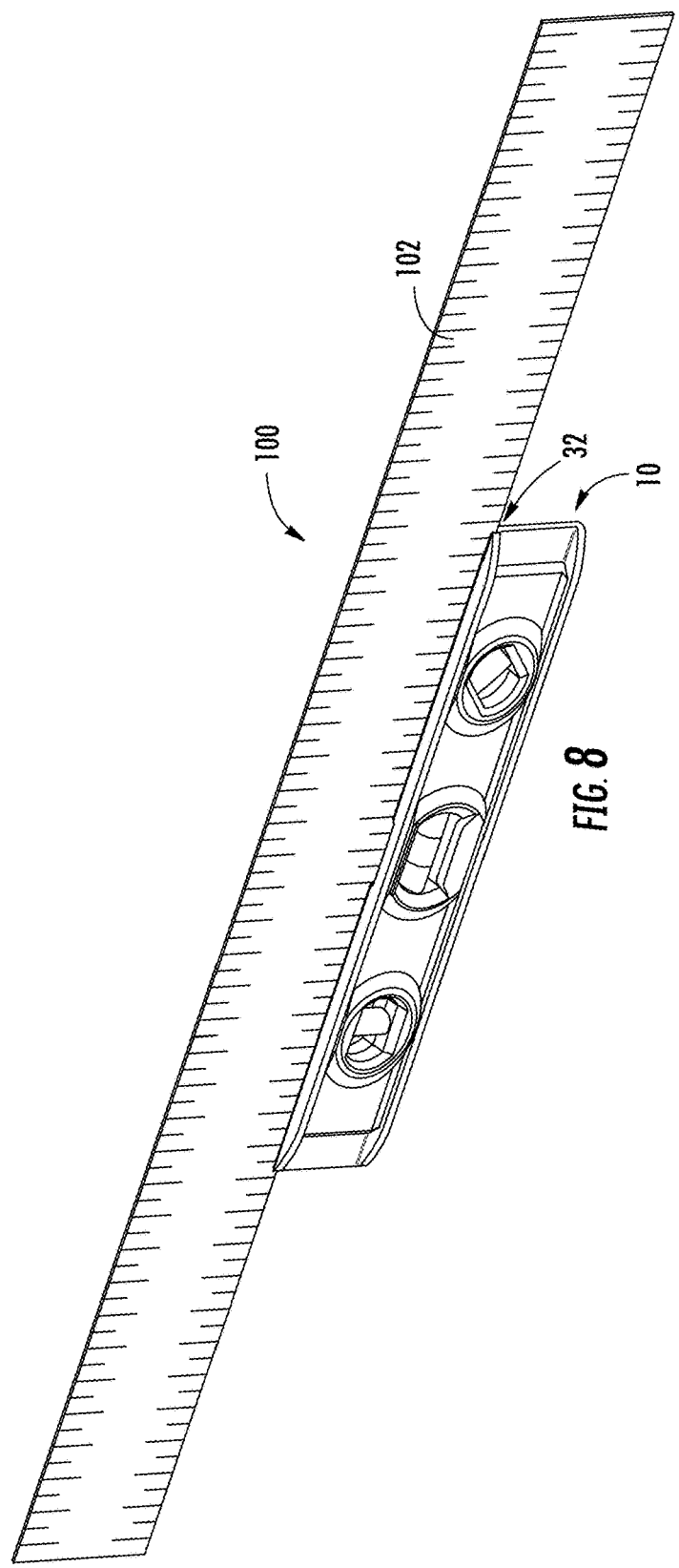
FIG. 8 is a perspective view of a level and straightedge system, according to an exemplary embodiment.
Figure 9:
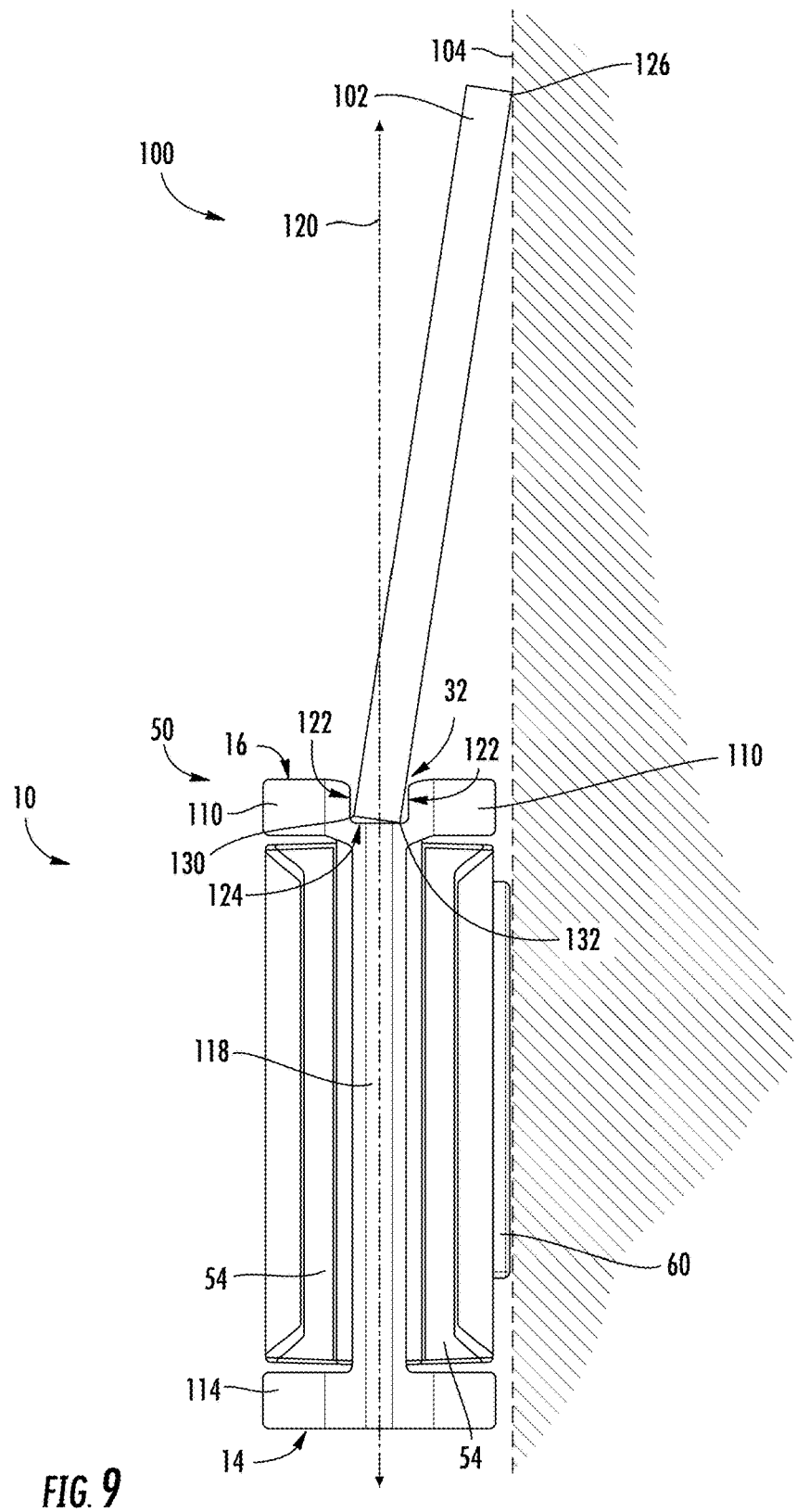
FIG. 9 is an end view of the level and straightedge system of FIG. 8, according to an exemplary embodiment.

Referring to FIG. 8 and FIG. 9, a level and straightedge system 100 is shown according to an exemplary embodiment. In general, level and straightedge system 100 includes level 10 (or level 90), and a straightedge 102 positioned with channel 32 of level 10. As shown best in FIG. 8, the maximum length of straightedge 102 is substantially greater than the maximum length of level 10, such as at least twice the maximum length of level 10. In specific embodiments, the maximum length of level 10 is less than or equal to 14 inches, and the maximum length of level 10 is 36 inches or more. In specific embodiments, despite the large difference in lengths, the design of level 10 allows straightedge 102 to be held securely adjacent to a workpiece, such as a wall, allowing a line to be marked using straightedge 102 while reducing the risk that straightedge 102 and/or level 10 will shift during marking.

Referring to FIG. 9, an end view showing system 100 positioned for line marking against a wall 104 is shown according to an exemplary embodiment. In this view, the structure of level 100 for support of straightedge 102 can be seen. Specifically, level 10 includes a level frame, shown as central body 50, forming an "I-beam" cross-sectional shape. Central body 50 includes an upper wall 110 that defines a planar upper surface 16 and a lower wall 114 defining a planar base surface 14. Base surface 14 is parallel to the upper surface 16 and generally is a planar working surface that engages a workpiece when during leveling measurements.

Central body 50 includes a central vertical wall 118 that couples upper wall 110 to lower wall 114. Channel 32 is formed in upper wall 110, and as shown in FIG. 8, channel 32 extends the entire length of upper wall 110. As will generally be understood, vial openings 18, 20 and 22 (shown in FIG. 1) are partially formed/defined within central wall 118 with corresponding and aligned openings being formed within face plates 54.

Providing the "I-beam" shape, central body 50 is shaped with vertical wall 118 centrally located such that a vertical plane 120 that bisects vertical wall 118 also intersects channel 32. In the specific embodiment shown, both upper wall 110 and lower wall 114 are horizontal walls, and vertical wall 118 is perpendicular to upper wall 110 and lower wall 114. In this arrangement, vertical plane 120 bisects upper wall 110, lower wall 114, channel 32, upper surface 16 and/or lower surface 14.

As shown in FIG. 8 and FIG. 9, Applicant has identified a structure, shape and design of channel 32 and of gripping collar 60 that allow a large straightedge, such as straightedge 102, to be securely supported by even a relatively short level, such as level 10. Channel 32 includes a pair of opposing sidewall surfaces 122 and a lower surface 124. As shown in the embodiment of FIG. 9, channel sidewall surfaces 122 are vertical surfaces and lower surface 124 is a horizontal surface.

Channel 32 is sized such that straightedge 102 is angled or tilted within channel 32 when in use, as shown in FIG. 9. This angled position works in conjunction with gripping collar 60 to securely position level 10 and straightedge 102 along wall 104. To facilitate this arrangement, the width of channel 32 is larger than the width of straightedge 102, and straightedge 102 is angled such that a left lower corner 130 engages one of the channel sidewall surfaces 122 and a lower right corner 132 engages lower channel surface 124. Providing a third contact point, straightedge 102 has an upper corner 126 that is engaged along wall 104. The three points of contact, two within channel 32 and one against wall 104, along with the angled orientation of straightedge 102 provides a stable support of straightedge 102 by level 10 along wall 104.

To further increase stability, the angled positioning of straightedge 102 within channel 32 works together with gripping collar 60 to further secure level 10 in place along wall 104 for line marking. In use, the horizontally outermost surface of collar 60 engages wall 104 such that a common vertical plane (in this case represented by the outer surface of wall 104) intersects both the outer surface of gripping collar 60 and upper corner 126 of straightedge 102. Applicant has found that this combination of channel-shape, allowing angled straightedge positioning, along with gripping collar 60 provides a stable straightedge support such that a straight mark can be made along an upper corner 126 without shifting, even given the large length differences between level 10 and straightedge 102.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more component or element, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level and straightedge system comprising:
    a level comprising:
        an upper wall defining a planar upper surface;
        a lower wall defining a planar base surface parallel to the upper surface;
        a vertical wall coupling the upper wall to the lower wall;
        a vial opening defined at least in part within the vertical wall;
        a level vial supported within the vial opening;
        a maximum length extending between opposing ends of the level;
        a gripping collar extending horizontally outward away from the vertical central wall such that the gripping collar defines a maximum width of the level; and
        a channel formed in the upper wall and extending the entire length of the upper wall, wherein a vertical plane bisecting the vertical wall intersects the channel; and
    a straightedge having a lower end positioned within the channel such that the straightedge is supported by the level;
    wherein the straightedge is positioned within the channel at an angle relative to the vertical plane; and
    wherein the straightedge is angled such that a single vertical plane intersects both an upper corner of the straightedge and an outer surface of the gripping collar.

2. The level and straightedge system of claim 1, wherein a maximum length of the straightedge is at least twice the maximum length of the level.

3. The level and straightedge system of claim 1, wherein the level further comprises a body plate coupled to the vertical wall, the body plate formed from a first plastic material, wherein the gripping collar is formed from a second plastic material and is coupled to the first plastic material of the body plate.

4. The level and straightedge system of claim 3, wherein the second plastic material of the gripping collar is bonded via co-molding with the first plastic material of the body plate.

5. The level and straightedge system of claim 1, wherein a width of the channel is greater than a width of the straightedge, wherein the straightedge is angled such that a first lower corner engages a sidewall surface of the channel and a second lower corner engages a lower surface of the channel.

6. The level and straightedge system of claim 5, wherein the sidewall surface of the channel is a vertically oriented surface and the lower surface of the channel is a horizontal surface.

7. The level and straightedge system of claim 6, wherein the upper wall and the lower wall are horizontal walls and the vertical wall is perpendicular to the upper wall and the lower wall, wherein the vertical wall is positioned such that the vertical plane bisects the upper wall, the lower wall and the channel.

8. The level and straightedge system of claim 6, wherein the maximum length of level is 14 inches or less and the maximum length of the straightedge is at least 36 inches.

9. A level comprising:
- a level frame formed from a metal material, the level frame comprising:
  - an upper wall defining a planar upper surface;
  - a lower wall defining a planar base surface parallel to the upper surface;
  - a vertical wall coupling the upper wall to the lower wall and defining a vertical plane that bisects the vertical wall; and
  - a vial opening defined at least in part within the vertical wall; and
  - wherein the upper wall and lower wall are horizontal walls and the vertical wall is perpendicular to the upper and lower wall, the vertical wall is positioned such that a vertical plane bisecting the vertical wall also bisects the upper wall and the lower wall;
- a level vial supported by the level frame within the vial opening;
- a body plate coupled to the vertical wall formed from a first plastic material; and
- a gripping collar formed from a second plastic material coupled to the first plastic material of the body plate, the gripping collar at least partially surrounding the vial opening and extending horizontally outward away from the vertical central wall such that the gripping collar defines a maximum width of the level.

10. The level of claim 9, wherein the second plastic material is a Shore A material, and the first plastic material is a Shore D material.

11. The level of claim 9, wherein the second plastic material is co-molded with the first plastic material such that the second plastic material is bonded to the first plastic material.

12. The level of claim 9, wherein a coefficient of sliding friction of the first plastic material is less than a coefficient of sliding friction of the second plastic material.

13. The level of claim 9, wherein a maximum length extending between opposing ends of the level frame is 14 inches or less, wherein opposing end sections of both the upper wall and the lower wall have tapered outer surfaces.

14. The level of claim 13, wherein the level frame defines a channel located in the upper wall that extends the entire length of the upper wall, wherein the vertical plane that bisects the vertical wall also intersects the channel.

15. A level comprising:
- a level frame formed from a metal material, the level frame comprising:
  - an upper wall defining a planar upper surface;
  - a lower wall defining a planar base surface parallel to the upper surface;
  - a vertical wall coupling the upper wall to the lower wall;
  - a vial opening defined at least in part within the vertical wall; and
  - a channel formed in the upper wall that extends the entire length of the upper wall, wherein a vertical plane bisecting the vertical wall intersects the channel;
- a level vial supported by the level frame within the vial opening;
- a body plate coupled to the vertical wall formed from a first plastic material; and
- a gripping collar formed from a second plastic material bonded via co-molding to the first plastic material of the body plate;
- wherein the gripping collar at least partially surrounds the vial opening and extends horizontally outward away from the vertical central wall such that the gripping collar defines a maximum width of the level;
- wherein a maximum length extending between opposing ends of the level frame is 14 inches or less.

16. The level of claim 15, wherein the upper wall and lower wall are horizontal walls and the vertical wall is perpendicular to the upper and lower wall, the vertical wall positioned such that a vertical plane bisecting the vertical wall also bisects the upper wall, the lower wall and the channel, wherein opposing end sections of both the upper wall and the lower wall have outer surfaces that taper in the width direction.

17. The level of claim 15, wherein the second plastic material is a Shore A material, and the first plastic material is a Shore D material.

18. The level of claim 15, wherein a coefficient of sliding friction of the first plastic material is less than a coefficient of sliding friction of the second plastic material.

19. The level of claim 15, wherein the second plastic material is a thermoplastic elastomer material.

20. The level of claim 15, wherein the channel is defined by a pair of opposing vertically oriented surfaces and by a lower horizontal surface extending between the opposing vertically oriented surfaces.

* * * * *